US012803086B2

(12) United States Patent
Nagata et al.

(10) Patent No.: US 12,803,086 B2
(45) Date of Patent: Nov. 17, 2026

(54) BATTERY, BATTERY MODULE, AND METHOD FOR PRODUCING BATTERY

(71) Applicant: TOYOTA JIDOSHA KABUSHIKI KAISHA, Toyota (JP)

(72) Inventors: Yuka Nagata, Toyota (JP); Takamasa Maeda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 684 days.

(21) Appl. No.: 18/303,626

(22) Filed: Apr. 20, 2023

(65) Prior Publication Data

US 2023/0352775 A1 Nov. 2, 2023

(30) Foreign Application Priority Data

Apr. 28, 2022 (JP) ................................ 2022-074254

(51) Int. Cl.
*H01M 50/105* (2021.01)
*H01M 10/058* (2010.01)
*H01M 50/211* (2021.01)

(52) U.S. Cl.
CPC ....... *H01M 50/105* (2021.01); *H01M 10/058* (2013.01); *H01M 50/211* (2021.01)

(58) Field of Classification Search
CPC . H01M 50/105; H01M 50/211; H01M 10/058
See application file for complete search history.

(56) References Cited

U.S. PATENT DOCUMENTS

2004/0062983 A1 4/2004 Abe et al.
2011/0117404 A1 5/2011 Ahn et al.
2014/0072869 A1 3/2014 Hata et al.
2018/0090737 A1 3/2018 Sawanishi et al.
2018/0241023 A1 8/2018 Lim et al.
2020/0313126 A1 10/2020 Kagami

FOREIGN PATENT DOCUMENTS

JP 2001202934 A 7/2001
JP 2011108623 A 6/2011
JP 2013-211253 A 10/2013
JP 2014-188774 A1 † 11/2014
JP 2015-115313 A † 6/2015
(Continued)

*Primary Examiner* — Olatunji A Godo
(74) *Attorney, Agent, or Firm* — Dickinson Wright, PLLC

(57) ABSTRACT

A main object of the present disclosure is to provide a battery in which degrade in sealing performance is suppressed. The present disclosure achieves the object by providing a battery including: an electrode body; a side surface member arranged in a side surface part of the electrode body; and a laminate film that covers the electrode body, wherein; when the battery is viewed from a side surface of the side surface member, an outer periphery of the side surface member is positioned in inner side on the basis of an outer periphery of the electrode body; the laminate film is arranged to cover a surface configuring the outer periphery of the side surface member and a surface configuring the outer periphery of the electrode body; and on the side surface member, a fused part, in which inner surfaces of the laminate film are fused, is arranged.

12 Claims, 9 Drawing Sheets

(56) References Cited

FOREIGN PATENT DOCUMENTS

| | | | | |
|---|---|---|---|---|
| JP | 2017152140 | A | | 8/2017 |
| JP | 2019175552 | A | | 10/2019 |
| JP | 2020161391 | A | | 10/2020 |
| JP | 2021150231 | A | | 9/2021 |
| JP | 2021174579 | A | * | 11/2021 |
| WO | 2014188774 | A1 | | 11/2014 |
| WO | 2019142702 | A1 | | 7/2019 |

* cited by examiner
† cited by third party

BATTERY, BATTERY MODULE, AND METHOD FOR PRODUCING BATTERY

TECHNICAL FIELD

The present disclosure relates to a battery, a battery module, and a method for producing a battery.

BACKGROUND ART

Batteries such as a lithium ion secondary battery usually includes an electrode body including a cathode current collector, a cathode active material layer, an electrolyte layer, an anode active material layer and an anode current collector. The electrode body is, for example, sealed in an internal space surrounded by an exterior material. Patent Literature 1 discloses a lithium polymer secondary battery including an electrode assembly, an exterior material surrounding outside of the electrode assembly, a first cover and a second cover sealing the exterior material, wherein a first electrode terminal and a second electrode terminal are pulled outside respectively interposing the first cover and the second cover. Also, Patent Literature 1 describes a laminate film as the exterior material.

CITATION LIST

Patent Literature

Patent Literature 1: Japanese Patent Application Laid-Open (JP-A) No. 2011-108623

SUMMARY OF DISCLOSURE

Technical Problem

As shown in FIG. 3 which will be described later, the size of the side surface member may be made smaller than the size of the electrode body. When the side surface member with such a size relation is sealed by a laminate film, for example, wrinkles may be generated in the laminate film to degrade the sealing performance of the battery.

The present disclosure has been made in view of the above circumstances and a main object thereof is to provide a battery in which degrade in sealing performance is suppressed.

Solution to Problem

[1]

A battery including: an electrode body; a side surface member arranged in a side surface part of the electrode body; and a laminate film that covers the electrode body, wherein; when the battery is viewed from a side surface of the side surface member, an outer periphery of the side surface member is positioned in inner side on the basis of an outer periphery of the electrode body; the laminate film is arranged to cover a surface configuring the outer periphery of the side surface member and a surface configuring the outer periphery of the electrode body; and on the side surface member, a fused part, in which inner surfaces of the laminate film are fused, is arranged.

[2]

The battery according to [1], wherein, in a plan view of the battery from a thickness direction, the fused part is continuously arranged from an end part a of the laminate film in the side surface member side, until a position β of the laminate film corresponding to a boundary between the side surface member and the electrode body.

[3]

The battery according to [1] or [2], wherein, when the battery is viewed from a side surface of the side surface member, in a thickness direction of the battery, $P_1$ that is the highest position of the fused part is lower than $P_2$ that is the highest position of the laminate film arranged in the electrode body.

[4]

The battery according to any one of [1] to [3], wherein, when the battery is viewed from a side surface of the side surface member, in a thickness direction of the battery, $P_1$ that is the highest position of the fused part is lower than $P_3$ that is the highest position of the electrode body.

[5]

The battery according to any one of [1] to [4], wherein the fused part is arranged in a corner part configuring the outer periphery of the side surface member.

[6]

The battery according to any one of [1] to [5], wherein, when the battery is viewed from a side surface of the side surface member, a shape of the side surface member is square.

[7]

The battery according to any one of [1] to [6], wherein a plurality of the fused part is arranged on the side surface member.

[8]

The battery according to any one of [1] to [7], wherein the side surface member is a current collecting terminal.

[9]

The battery according to any one of [1] to [8], wherein; the battery includes a pair of the side surface member; and the pair of the side surface member is arranged to oppose to the electrode body.

[10]

The battery according to any one of [1] to [9], wherein, when the battery is viewed from a side surface of the side surface member, a rate of $L_2$ that is a length of the outer periphery in the side surface member, with respect to $L_1$ that is a length of the outer periphery in the electrode body, the rate $L_2/L_1$ is 0.7 or more and less than 1.

[11]

The battery according to any one of [1] to [10], wherein the electrode body includes layers in an order of, a cathode current collector, a cathode active material layer, an electrolyte layer, an anode active material layer, and an anode current collector, in a thickness direction.

[12]

A battery module comprising a plurality of a battery stacked in a thickness direction, wherein the battery is the battery according to any one of [1] to [11].

[13]

The battery module according to [12], wherein the battery module includes a restraining jig that restrains the plurality of the battery in a thickness direction.

[14]

The battery module according to [12] or [13], wherein, in a pair of the side surface member neighboring in the thickness direction, a main surface of the laminate film arranged on one of the side surface member does not contact a main surface of the laminate film arranged on the other side surface member.

[15]

A method for producing the battery according to any one of [1] to [11], the method comprising: a preparing step of preparing a structure body including the electrode body and the side surface member; a first covering step of covering a surface configuring the outer periphery of the electrode body in the structure body, with the laminate film; and a second covering step of covering a surface configuring the outer periphery of the side surface member in the structure body, with the laminate film, wherein; in the second covering step, the fused part is formed by a jig capable of surface contact with the surface configuring the outer periphery of the side surface member.

[16]

The method for producing the battery according to [15], wherein; when the battery is viewed from a side surface of the side surface member, a shape of the side surface member is square; the square includes a first side, a second side close to the first side, a third side close to the second side and oppose to the first side, and a fourth side close to the third side and oppose to the second side; the second covering step includes: a first adhering treatment of adhering the laminate film to the first side by pushing into a first jig from the first side in the side surface member, and to the third side by pushing into a third jig from the third side in the side surface member; and after the first adhering treatment, a second adhering treatment of adhering the laminate film to the second side by pushing into a second jig from the second side in the side surface member, and to the fourth side by pushing into a fourth jig from the fourth side in the side surface member; and at least one of the first jig and the third jig includes an elastic member, and in the second adhering treatment, the fused part is formed by pushing into the second jig and the fourth jig to compress and deform the elastic member.

Advantageous Effects of Disclosure

The battery in the present disclosure exhibits an effect of suppressing degrade in sealing performance.

DESCRIPTION OF EMBODIMENTS

The battery in the present disclosure will be hereinafter explained in details with reference to drawings. Each drawing described as below is a schematic view, and the size and the shape of each portion are appropriately exaggerated in order to be understood easily. Furthermore, in the present description, upon expressing an embodiment of arranging one member with respect to the other member, when it is expressed simply "on" or "below", both of when the other member is directly arranged on or below the one member so as to contact with each other, and when the other member is arranged above or below the one member interposing an additional member, can be included unless otherwise described.

A. Battery

Figure 1A:
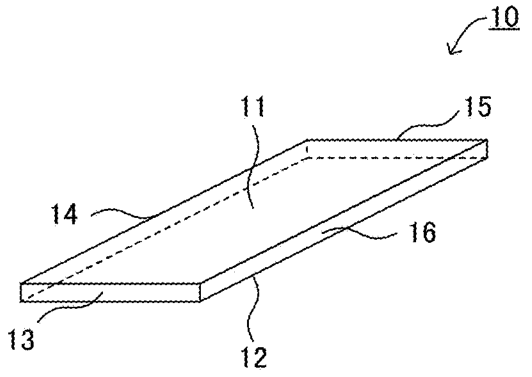
FIGS. 1A and 1B are schematic perspective views exemplifying the electrode body and the side surface member in the present disclosure.
Figure 1B:
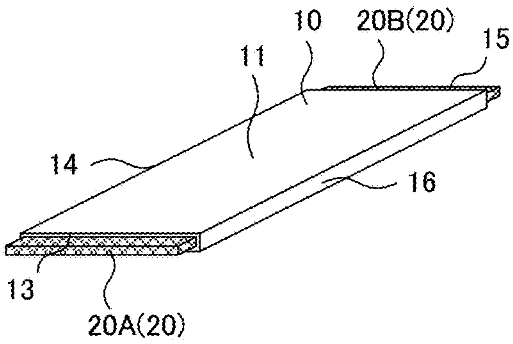

FIGS. 1A and 1B are schematic perspective views exemplifying the electrode body and the side surface member in the present disclosure. Electrode body 10 shown in FIG. 1A includes top surface part 11, bottom surface part 12 opposing the top surface part 11, and four side surface parts (first side surface part 13, second side surface part 14, third side surface part 15 and fourth side surface part 16) connecting the top surface part 11 and the bottom surface part 12. Also, in FIG. 1B, first side surface member 20A is arranged in the first side surface part 13 in the electrode body 10, and second side surface member 20B is arranged in the third side surface part 15 in the electrode body 10. For example, the first side surface member 20A is a cathode current collecting terminal, and the second side surface member 20B is an anode current collecting terminal.

Figure 2A:
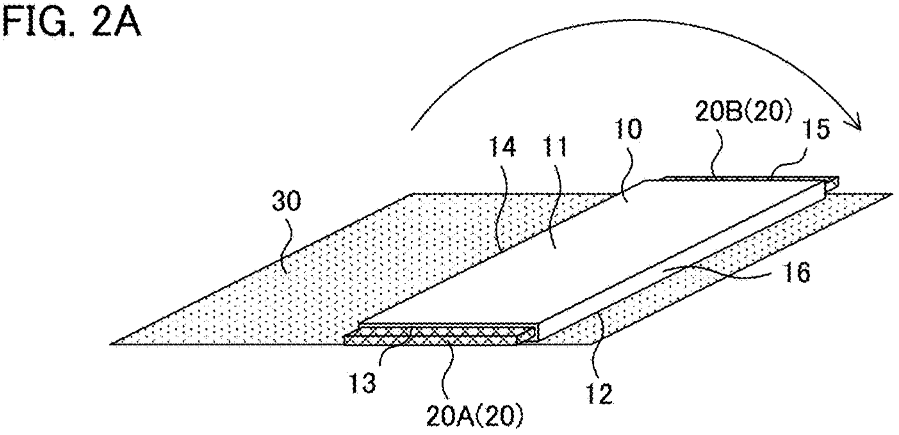
FIGS. 2A and 2B are schematic perspective views exemplifying the electrode body, the side surface member and the laminate film in the present disclosure.
Figure 2B:
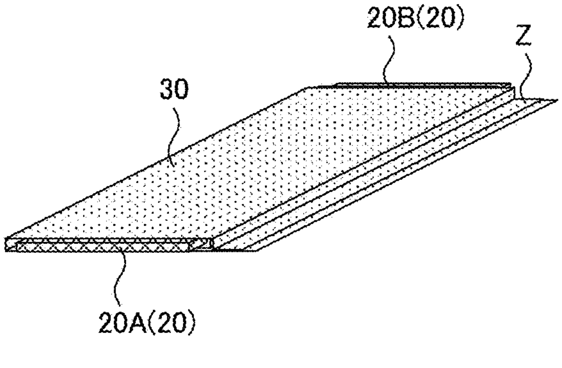

FIGS. 2A and 2B are schematic perspective views exemplifying the electrode body, the side surface member and the laminate film in the present disclosure. As shown in FIG. 2A, laminate film 30 is, for example, a piece of film. Also, as shown in FIGS. 2A and 2B, the laminate film 30 is folded so as to cover the bottom surface part 12, the second side surface part 14, the top surface part 11 and the fourth side surface part 16 in the electrode body 10 entirely. Meanwhile, in FIG. 2B, at least a part of the first side surface member 20A and at least a part of the second side surface member 20B are positioned in the inner side of the laminate film 30 folded.

Figure 3A:
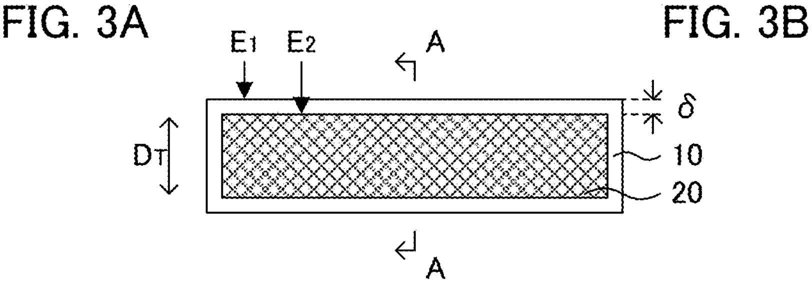
FIGS. 3A to 3D are schematic side surface views and schematic cross-sectional views exemplifying the electrode body, the side surface member and the laminate film in the present disclosure.
Figure 3B:
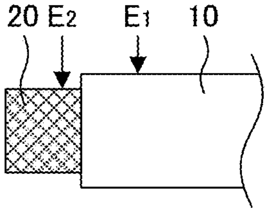

FIG. 3A is a schematic side surface view exemplifying the electrode body and the side surface member in the present disclosure, and FIG. 3B is a cross-sectional view of A-A in FIG. 3A. As shown in FIGS. 3A and 3B, when the electrode body 10 and the side surface member 20 are viewed from the side surface member 20 side, outer periphery $E_2$ of the side surface member 20 is positioned in the inner side on the basis of outer periphery $E_1$ of the electrode body 10. In other words, the size of the side surface member 20 is smaller than the size of the electrode body 10.

Figure 3C:
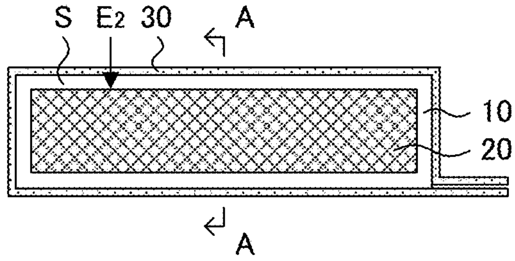
Figure 3D:
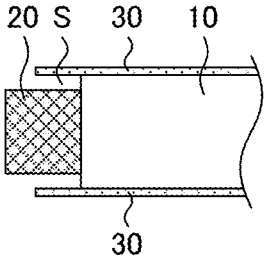
Figure 4:
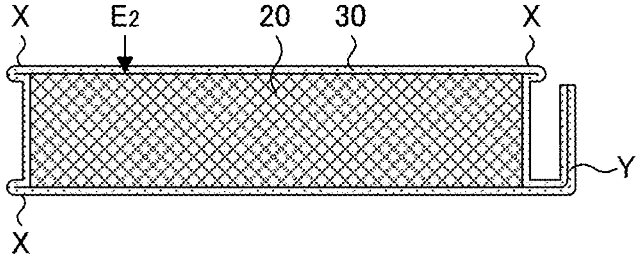
FIG. 4 is a schematic side surface view exemplifying a part of the battery in the present disclosure.

FIG. 3C is a schematic side surface view exemplifying the electrode body, the side surface member and the laminate film in the present disclosure, and FIG. 3D is a cross-sectional view of A-A in FIG. 3C. As shown in FIGS. 3C and 3D, when the electrode body 10, the side surface member 20 and the laminate film 30 are viewed from the side surface member 20 side, there is space S between the laminate film 30 and the side surface member 20. For this reason, when the side surface member 20 is sealed by the laminate film 30, wrinkles are generated in the laminate film 30 due to excessive part of the laminate film 30, and the sealing performance of the battery may be degraded. In contrast, in the battery of the present disclosure, as shown in FIG. 4, on the side surface member 20, fused part X, in which inner surfaces of the laminate film 30 (surface of the side surface member 20 side) are fused, is arranged.

According to the present disclosure, the fused part is arranged on the side surface member, and thus degrade in sealing performance is suppressed in the battery. As shown in FIGS. 3A to 3D described above, the size of the side surface member may be made smaller than the size of the electrode body. By applying such a size relation, for example, when a plurality of the battery is stacked, the side surface members neighboring can be prevented from contacting each other. When the contact of the side surface members neighboring is prevented, breakage of the battery does not easily occur. Also, when the side surface member with such a size relation is sealed by the laminate film, for example, wrinkles may be generated in the laminate film to degrade the sealing performance of the battery. In the present disclosure, the fused part X, in which inner surfaces of the laminate film are fused, is arranged on the side surface member, and thus degrade in sealing performance in the battery is suppressed even when the size of the side surface member is made smaller than the size of the electrode body.

1. Constitution of Battery

The battery in the present disclosure includes at least an electrode body, a side surface member, and a laminate film.

(1) Electrode Body

The electrode body in the present disclosure works as a power generating element of a battery. The shape of the electrode body is not particularly limited, but for example, as shown in FIG. 1A, top surface part 11, bottom surface part 12 opposing to the top surface part 11, and four side surface part (first side surface part 13, second side surface part 14, third side surface part 15 and fourth side surface part 16) connecting the top surface part 11 and the bottom surface part 12, are included. Both of the top surface part 11 and the bottom surface part 12 correspond to the main surface of the electrode body, and the normal direction of the main surface can be defined as a thickness direction. Also, the first side surface part 13 and the third side surface part 15 are arranged so as to oppose to each other. Similarly, the second side surface part 14 and the fourth side surface part 16 are arranged so as to oppose to each other.

There are no particular limitations on the shape of the op surface part, and examples thereof may include a square shape such as a foursquare shape, a rectangular shape, a diamond shape, a trapezoid shape, and a parallelogram shape. The shape of the top surface part 11 in FIG. 1A is a rectangular shape. Also, the shape of the top surface part may be a polygon shape other than the square shape, and may be a shape with a curved line such as a circle. Also, the shape of the bottom surface part is the same manner as the shape of the top surface part. There are no particular limitations on the shape of the side surface part, and examples thereof may include a square shape such as a foursquare shape, a rectangular shape, a diamond shape, a trapezoid shape, and a parallelogram shape.

(2) Side Surface Member

The side surface member in the present disclosure is arranged in the side surface part of the electrode body. The battery in the present disclosure may include one of the side surface member, and may include two or more of the side surface member with respect to one electrode body. In the latter case, for example, as shown in FIG. 1B, a pair of the side surface member 20 (the first side surface member 20A and the second side surface member 20B) may be arranged to oppose to each other, with respect to the electrode body 10. Also, in FIG. 1B, a pair of the side surface member 20 is arranged to oppose to each other in the longer direction of the electrode body 10. Meanwhile, although not illustrated in particular, the pair of the side surface member may be arranged to oppose to each other in the shorter direction of the electrode body.

There are no particular limitations on the shape of the side surface member, and examples thereof may include a square shape such as a foursquare shape, a rectangular shape, a diamond shape, a trapezoid shape, and a parallelogram shape. The shape of the side surface member 20 in FIG. 3A is a rectangular shape. In this rectangular shape, a short side extends along a direction parallel to thickness direction $D_T$, and a longer side extends along a direction vertical to the thickness direction $D_T$. Also, the shape of the side surface member may be a polygon shape other than the square shape, and may be a shape with a curved line such as a circle. Also, the side surface member may include a corner part where the two sides (straight lines) cross.

When the battery is viewed from a side surface of the side surface member, an outer periphery of the side surface member is positioned in inner side on the basis of an outer periphery of the electrode body. For example, as shown in FIG. 3A, the outer periphery $E_2$ of the side surface member 20 is positioned in inner side on the basis of the outer periphery $E_1$ of the electrode body 10. In other words, the outer periphery $E_2$ of the side surface member 20 is included all around in the outer periphery $E_1$ of the electrode body 10. Also, the size of the side surface member 20 is smaller than the size of the electrode body 10.

For example, in FIG. 3A, $L_1$ designates a length (length all around) of the outer periphery $E_1$ in the electrode body 10, and $L_2$ designates the length (length all around) of the outer periphery $E_2$ of the side surface member 20. The rate of $L_2$ with respect to $L_1$, which is $L_2/L_1$ is, for example, 0.7 or more and less than 1, and may be 0.8 or more and 0.95 or less. Also, for example, in FIG. 3A, $L_a$ designates a length of the outer periphery $E_1$ in the thickness direction $D_T$, and $L_b$ designates a length of the outer periphery $E_2$ in the thickness direction $D_T$. The rate of $L_b$ with respect to $L_a$, which is $L_b/L_a$ is, for example, 0.5 or more and less than 1, and may be 0.8 or more and 0.95 or less. Also, for example, in FIG. 3A, $L_c$ designates a length of the outer periphery $E_1$ in a direction orthogonal to the thickness direction $D_T$, and $L_d$ designates a length of the outer periphery $E_2$ in a direction orthogonal to the thickness direction $D_T$. The rate of $L_d$ with respect to $L_c$, which is $L_d/L_c$ is, for example, 0.5 or more and less than 1, and may be 0.8 or more and 0.95 or less. Also, for example, in FIG. 3A, δ designates a length of a space between the outer periphery $E_1$ and the outer periphery $E_2$. The δ is larger than 0 mm, may be 0.3 mm or more, and may be 0.5 mm or more. Meanwhile, the δ is, for example, 1.5 mm or less.

(3) Laminate Film

The laminate film in the present disclosure covers the electrode body, and seals the electrode body together with the side surface member. As shown in FIGS. 2A and 2B, the laminate film 30 is arranged to cover a surface configuring the outer periphery of the side surface member 20 and a surface configuring the outer periphery of the electrode body 10, when the electrode body 10 and the side surface member 20 are viewed from the side surface member 20 side. Also, as shown in FIG. 4, on the side surface member 20, the fused part X, in which inner surfaces of the laminate film 30 are fused, is arranged. The fused surface in the fused part X preferably does not include a void. Also, in FIG. 4, end part adhered part Y where end parts of the laminate film 30 are fused, is arranged. The end part adhered part Y may be subjected to a folding process according to a shape of the side surface member. The reason therefor is to reduce an excessive space.

Figure 5:
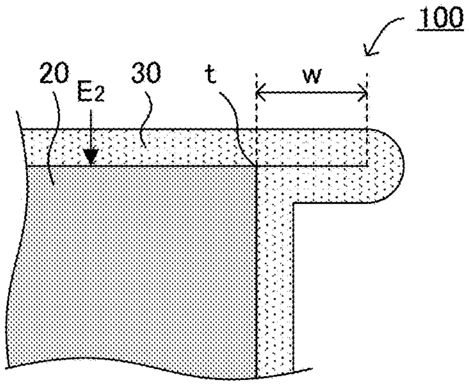
FIG. 5 is a schematic side surface view exemplifying a part of the battery in the present disclosure.

In FIG. 5, when battery 100 is viewed from the side of the side surface member 20, the fused part X is arranged in the corner part configuring the outer periphery $E_2$ of the side surface member 20. In specific, the corner part configuring the outer periphery $E_2$ of the side surface member 20 matches end part t of the fused surface in the fused part X. Also, as shown in FIG. 5, w designates a width of the fused surface in the fused part X. The width w is, for example, 0.1 mm or more, may be 0.3 mm or more, and may be 0.6 mm or more. Meanwhile, the width w is, for example, 1.2 mm or less.

Figure 6:
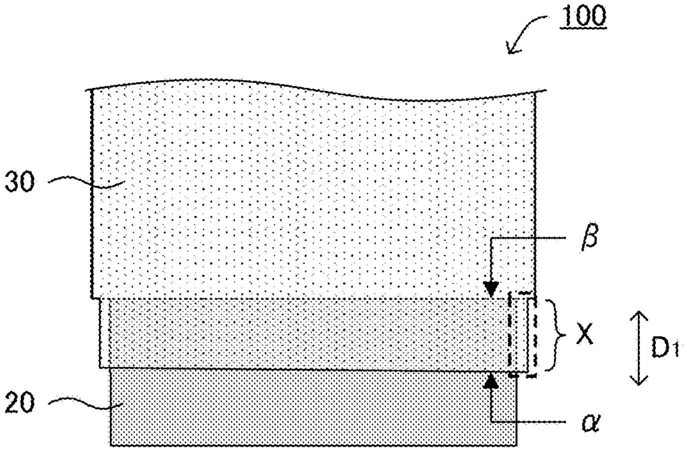
FIG. 6 is a schematic plan view exemplifying a part of the battery in the present disclosure.
Figure 7:
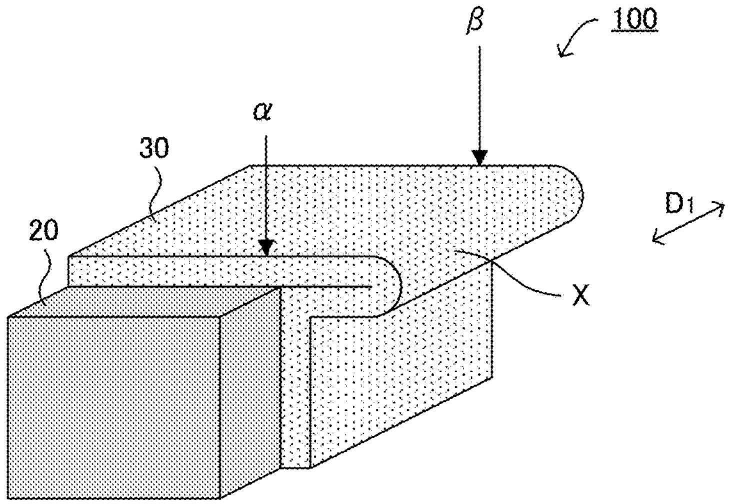
FIG. 7 is a schematic perspective view exemplifying a part of the battery in the present disclosure.

As shown in FIG. 6 and FIG. 7, in a plan view of the battery 100 from a thickness direction, α designates an end part position of the laminate film 30 in the side surface member 20 side, and β designates a position of the laminate film 30 corresponding to a boundary between the side surface member 20 and the electrode body 10. The fused part X in FIG. 6 and FIG. 7 is continuously arranged from the end part position α until the position β. Also, when $D_1$ designates a direction to which the side surface member 20 extends from the electrode body 30, the fused part X is preferably arranged along the direction $D_1$. Also, the fused part X may be arranged in at least a part of a region from the end part position α until the position β in the direction $D_1$. The length of the fused part X in the direction $D_1$ is, for example, 1 mm or more, may be 3 mm or more, and may be 5 mm or more.

Figure 8A:
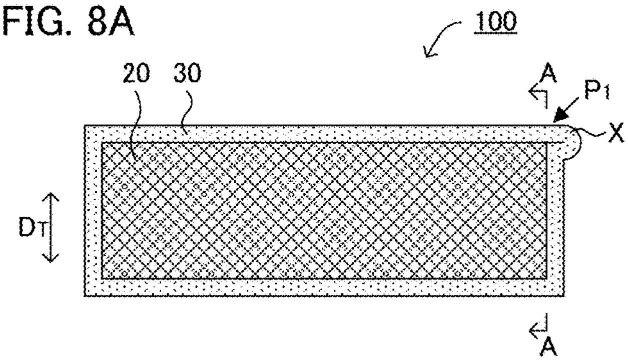
FIGS. 8A to 8D are schematic side surface views and schematic cross-sectional views exemplifying a part of the battery in the present disclosure.
Figure 8B:
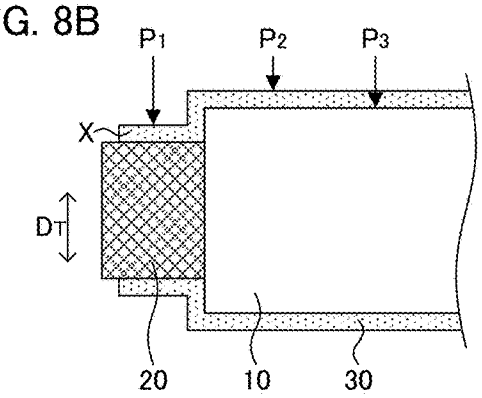

FIG. 8A is a schematic side surface view when a part of the battery 100 is viewed from the side of the side surface member 20, and FIG. 8B is a cross-sectional view of A-A in FIG. 8A. As shown in FIGS. 8A and 8B, in the thickness direction $D_T$ of the battery 100, $P_1$ designates the highest position of the fused part X, $P_2$ designates the highest position of the laminate film 30 arranged in the electrode body 10, and $P_3$ designates the highest position of the electrode body 10. The position $P_1$ in FIGS. 8A and 8B is lower than the position $P_2$ in the thickness direction $D_T$. Also, the position $P_1$ in FIGS. 8A and 8B is, in the thickness direction $D_T$, lower than the position $P_3$, but may be equivalent to the position $P_3$, and may be higher than the position $P_3$. Also, the position $P_1$ may be, in the thickness direction $D_T$, lower than the position of the top surface part of the electrode body 10.

Figure 8C:
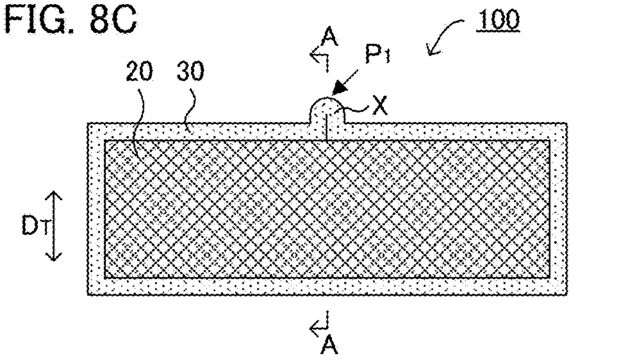
Figure 8D:
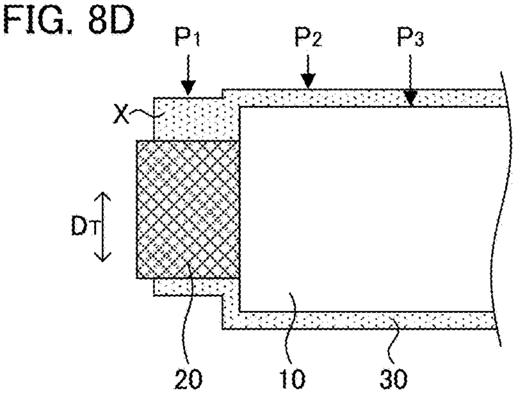

FIG. 8C is a schematic side surface view when a part of the battery 100 is viewed from the side of the side surface member 20, and FIG. 8D is a cross-sectional view of A-A in FIG. 8C. The fused part X in FIGS. 8A and 8B described above is respectively arranged in a corner part of the side surface member 20. Meanwhile, as shown in FIGS. 8C and 8D, the fused part X may be arranged in, among the sides configuring the outer periphery of the side surface member 20, a side extending to a direction crossing the thickness direction $D_T$. Also, the fused part X in FIGS. 8C and 8D is respectively arranged in a longer side (longer side of the top surface part side of the electrode body) configuring the outer periphery of the side surface member 20. Even when the fused part X is arranged in such a position, the position $P_1$ is preferably lower than the position $P_2$ in the thickness direction $D_T$. Also, the position $P_1$ in FIGS. 8C and 8D is respectively higher than the position $P_3$ in the thickness direction $D_T$, but may be equivalent to the position $P_3$, and may be lower than the position $P_3$. Also, the position $P_1$ may be, in the thickness direction $D_T$, lower than the position of the top surface part of the electrode body 10.

Figure 9A:
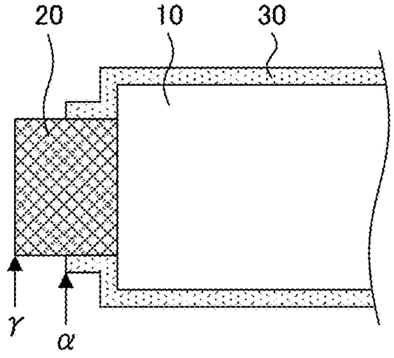
FIGS. 9A and 9B are schematic cross-sectional views exemplifying a part of the battery in the present disclosure.
Figure 9B:
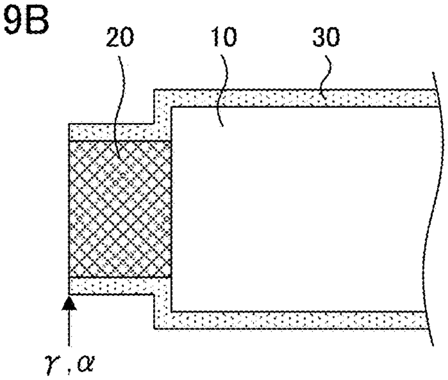

As shown in FIG. 9A, the end part position α of the laminate film 30 in the side surface member 20 side may be closer to the electrode body 10 side on the basis of the end part position γ that is in the opposite side to the electrode body 10 in the side surface member 20. In other words, in a plan view of the battery from the thickness direction, the laminate film 30 may cover a part of the side surface member 20. In this case, a part of the side surface member 20 (part not covered with the laminate film 30) is exposed. Meanwhile, as shown in FIG. 9B, the end part position α may match the end part position γ. In other words, in a plan view of the battery from the thickness direction, the laminate film 30 may cover the whole of the side surface member 20.

Figure 10A:
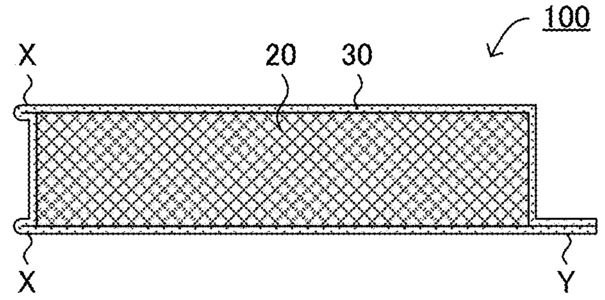
FIGS. 10A to 10D are schematic side surface views exemplifying a part of the battery in the present disclosure.

FIGS. 10A to 10D are respectively a schematic side surface view of a part of the battery 100 viewed from the side surface of the side surface member 20 side. As shown in FIG. 10A, the fused part X is arranged in a corner part configuring the outer periphery of the side surface member 20. In FIG. 10A, two of the fused part X is shown, but with respect to one side surface member 20, one of the fused part X may be arranged, and 3 or more of the fused part X may be arranged. Above all, with respect to the side surface member 20, a plurality of the fused part X is preferably arranged. The reason therefor is to scatter and absorb the excessive part of the laminate film 30. Also, in the end part adhered part Y in FIG. 10A, inner surfaces of the end parts of the laminate film 30 are made contact to be fused.

Figure 10B:
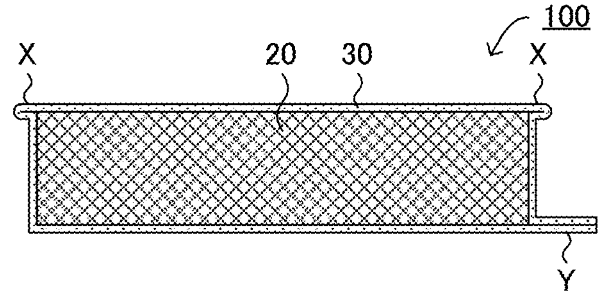
Figure 10C:
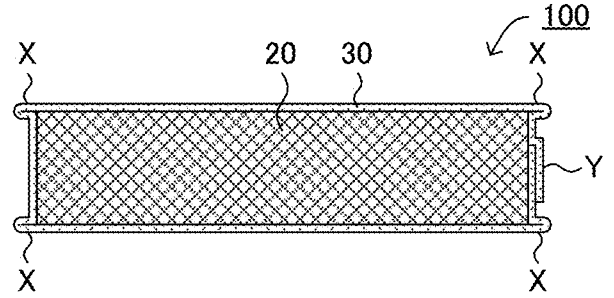
Figure 10D:
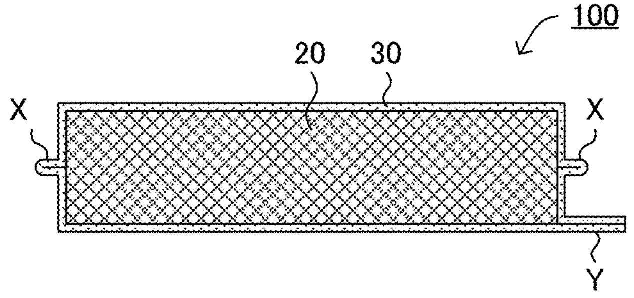

As shown in FIG. 10A, two of the fused part X may be respectively arranged in two of the corner part in one shorter side configuring the outer periphery of the side surface member 20. Also, as shown in FIG. 10B, two of the fused part X may be respectively arranged in two of the corner part in one longer side configuring the outer periphery of the side surface member 20. Also, as shown in FIG. 10C, four of the fused part X may be respectively arranged in four of the corner part configuring the outer periphery (in square shape) of the side surface member 20. In the end part adhered part Y in FIG. 10C, inner surface of one end part of the laminate film 30 is made contact with the outer surface of the other end part of the laminate film 30 to be adhered. Also, as shown in FIG. 10D, the fused part X may be arranged in an intermediate part (a part not the corner part) of a side configuring the outer periphery of the side surface member 20.

2. Battery Parts

The battery in the present disclosure includes an electrode body, a side surface member, and a laminate film.

(1) Electrode Body

Figure 11:
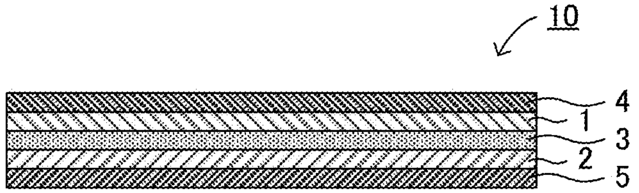
FIG. 11 is a schematic cross-sectional view exemplifying the electrode body in the present disclosure.

The electrode body in the present disclosure usually includes layers in an order of, a cathode current collector, a cathode active material layer, an electrolyte layer, an anode active material layer, and an anode current collector, in a thickness direction. For example, the electrode body 10 shown in FIG. 11 includes layers in an order of, cathode current collector 4, cathode active material layer 1, electrolyte layer 3, anode active material layer 2, and anode current collector 5, in a thickness direction.

The cathode active material layer contains at least a cathode active material. The cathode active material layer may further contain at least one of a conductive material, an electrolyte and a binder. Examples of the cathode active material may include an oxide active material. Examples of the oxide active material may include a rock salt bed type active material such as $LiNi_{1/3}Co_{1/3}Mn_{1/3}O_2$; a spinel type active material such as $LiMn_2O_4$; and an olivine type active material such as $LiFePO_4$. Also, as the cathode active material, sulfur (S) may be used. Examples of the shape of the cathode active material may include a granular shape.

Examples of the conductive material may include a carbon material. The electrolyte may be a solid electrolyte and may be an electrolyte solution. The solid electrolyte may be an organic solid electrolyte such as a gel electrolyte, and may be an inorganic solid electrolyte such as an oxide solid electrolyte and a sulfide solid electrolyte. Also, the electrolyte solution (liquid electrolyte) contains, for example, a supporting electrolyte such as $LiPF_6$, and a solvent such as a carbonate-based solvent. Also, examples of the binder may include a rubber-based binder and a fluoride-based binder.

The anode active material layer contains at least an anode active material. The anode active material layer may further contain at least one of a conductive material, an electrolyte, and a binder. Examples of the anode active material may include a metal active material such as Li and Si, a carbon active material such as graphite, and an oxide active material such as $Li_4Ti_5O_{12}$. Examples of the shape of the anode active material may include a granular shape and a foil shape. The conductive material, the electrolyte, and the binder are in the same contents as those described above.

The electrolyte layer is a layer arranged between the cathode active material layer and the anode active material layer, and contains at least an electrolyte. The electrolyte may be a solid electrolyte and may be an electrolyte solution. The electrolyte is in the same contents as those described above. The electrolyte layer may include a separator.

The cathode current collector collects currents of the cathode active material layer. Examples of the material for the cathode current collector may include a metal such as aluminum, SUS, and nickel. Examples of the shape of the cathode current collector may include a foil shape and a mesh shape. The cathode current collector may include a cathode tab for electronically connecting to a cathode current collecting terminal.

The anode current collector collects currents of the anode active material layer. Examples of the material for the anode current collector may include a metal such as copper, SUS, and nickel. Examples of the shape of the anode current collector may include a foil shape and a mesh shape. The anode current collector may include an anode tab for electronically connecting to an anode current collecting terminal.

(2) Side Surface Member

The side surface member in the present disclosure is arranged in the side surface part of the electrode body. The side surface member is not particularly limited if a member can be arranged in the side surface part of the electrode body, but is preferably a current collecting terminal. The current collecting terminal refers to a terminal including a current collecting part in at least a part thereof. The current collecting part is, for example, electronically connected to a tab in the electrode body. The current collecting terminal may be entirely the current collecting part, and may be partially the current collecting part. Also, the side surface member may be an exterior material without current collecting function. Also, examples of the material for the side surface member may include a metal such as SUS.

(3) Laminate Film

The laminate film in the present disclosure includes at least a structure in which a heat fusion layer and a metal layer are laminated. Also, the laminate film may include layers in the order of, the heat fusion layer, the metal layer and a resin layer along with the thickness direction. Examples of the material for the heat fusion layer may include an olefin-based resin such as polypropylene (PP) and polyethylene (PE). Examples of the material for the metal layer may include aluminum, an aluminum alloy, and stainless steel. Examples of the material for the resin layer may include polyethylene terephthalate (PET) and nylon. The thickness of the heat fusion layer is, for example, 40 μm or more and 100 μm or less. The thickness of the metal layer is, for example, 30 μm or more and 60 μm or less. The thickness of the resin layer is, for example, 20 μm or more and 60 μm or less. The thickness of the exterior body is, for example, 80 μm or more and 250 μm or less.

(4) Battery

The battery in the present disclosure is typically a lithium ion secondary battery. Examples of the applications of the battery in the present disclosure may include a power source for vehicles such as hybrid electric vehicles (HEV), plug-in hybrid electric vehicles (PHEV), battery electric vehicles (BEV), gasoline-fueled automobiles and diesel powered automobiles. In particular, it is preferably used as a power source for driving hybrid electric vehicles (HEV), plug-in hybrid electric vehicles (PHEV), or battery electric vehicles (BEV). Also, the battery in the present disclosure may be used as a power source for moving bodies other than vehicles (such as rail road transportation, vessel and airplane), and may be used as a power source for electronic products such as information processing equipment.

B. Battery Module

Figure 12:
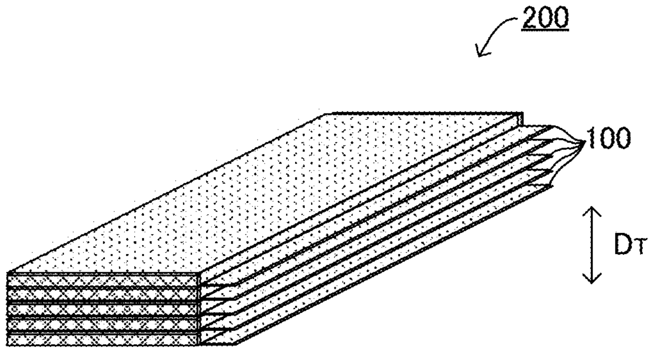
FIG. 12 is a schematic perspective view exemplifying the battery module in the present disclosure.

FIG. 12 is a schematic perspective view exemplifying the battery module in the present disclosure. Battery module 200 shown in FIG. 12 includes a plurality of the battery 100 stacked in the thickness direction $D_T$. The battery 100 is the battery described in "A. Battery" above.

According to the present disclosure, usage of the above described battery allows the battery module to suppress degrade in sealing performance.

The battery in the present disclosure is in the same contents as those described in "A. Battery" above; thus, the descriptions herein are omitted. Also, the battery module in the present disclosure may include a restraining jig that restrains the plurality of the battery in a thickness direction. There are no particular limitations on the kind of the restraining jig, and examples thereof may include a jig that applies restraining torque by a bolt. The restraining pressure applied by the restraining jig is, for example, 1 MPa or more and 50 MPa or less.

Figure 13:
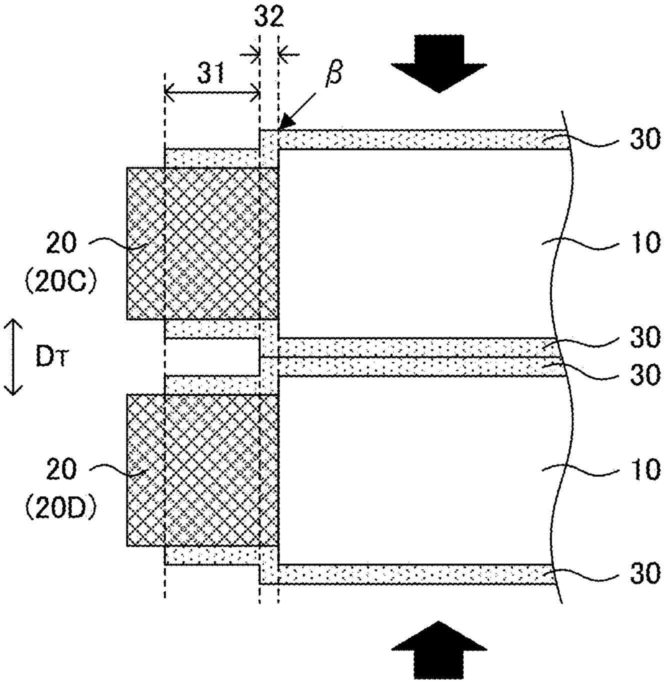
FIG. 13 is a schematic cross-sectional view exemplifying the battery module in the present disclosure.

As shown in FIG. 13, the laminate film 30 arranged on the side surface member 20 includes main surface part 31 and wall part 32. The wall part 32 is positioned between the main surface part 31, and position β of the laminate film 30 which corresponds to the boundary between the side surface member 20 and the electrode body 10. Also, when a restraining pressure is applied to the battery by the restraining jig, the battery is compressed in the thickness direction. In such a state, in a pair of the side surface member 20 (20C, 20D)

neighboring in the thickness direction $D_T$, it is preferable that the main surface 31 of the laminate film 30 arranged on one of the side surface member 20C does not contact the main surface 31 of the laminate film 30 arranged on the other side surface member 20D. The reason therefor is to prevent breakage due to the contact. Also, when a fused part is arranged in the main surface part of the laminate film, the fused part is included in the main surface part of the laminate film. In other words, it is preferable that the fused part arranged in the main surface part of the laminate film does not contact the main surface part of the laminate film arranged on the other side surface member. Also, in a state the restraining pressure is applied to the battery by the restraining jig, the above described position $P_1$ may be lower than the above described position $P_2$, and may be lower than the above described position $P_3$.

C. Method for Producing Battery

The method for producing a battery in the present disclosure is a method for producing the above described battery, and the method comprises: a preparing step of preparing a structure body including the electrode body and the side surface member; a first covering step of covering the outer periphery of the electrode body in the structure body, with the laminate film; and a second covering step of covering the outer periphery of the side surface member in the structure body, with the laminate film, wherein; in the second covering step, the fused part is formed by a jig capable of surface contact with the surface configuring the outer periphery of the side surface member.

According to the present disclosure, the fused part is formed, and thus a battery in which degrade in sealing performance is suppressed, is obtained.

1. Preparing Step

The preparing step in the present disclosure is a step of preparing a structure body including the electrode body and the side surface member. The electrode body and the side surface member are in the same contents as those described in "A. Battery" above; thus, the descriptions herein are omitted.

2. First Covering Step

The first covering step in the present disclosure is a step of covering the outer periphery of the electrode body in the structure body, with the laminate film. For example, as shown in FIGS. 2A and 2B, in the first covering step, surfaces (such as bottom surface part 12, second side surface part 14, top surface part 11 and fourth side surface part 16) configuring the outer periphery of the electrode body 10, are covered with the laminate film 30. On this occasion, the electrode body 10 and the laminate film 30 may be adhered. Also, as shown in FIG. 2B, end part overlapped part Z where the end parts of the laminate film 30 are overlapped, is heated. Thereby, the end part adhered part Y in which the end parts of the laminate film 30 are fused, is formed. The laminate film may be subjected to a folding process in advance according to the shape of the electrode body.

Also, in the first covering step, usually, as shown in FIGS. 3C and 3D, there is space S between the laminate film 30 and the side surface member 20. This space S will disappear in the later described second covering step, and a fused part will be formed instead.

3. Second Covering Step

The second covering step in the present disclosure is a step of covering a surface configuring the outer periphery of the side surface member, with the laminate film. Also, in the second covering step, a fused part is formed.

Figure 14A:
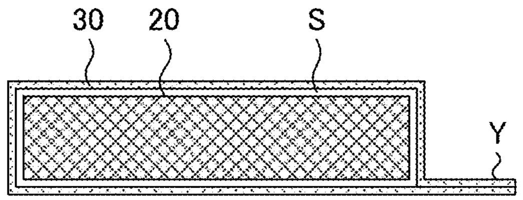
FIGS. 14A to 14C are schematic side surface views exemplifying the second covering step in the present disclosure.
Figure 14B:
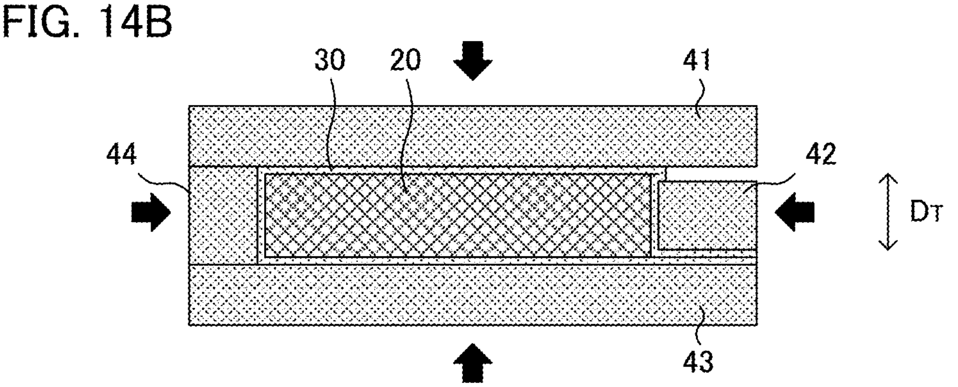
Figure 14C:
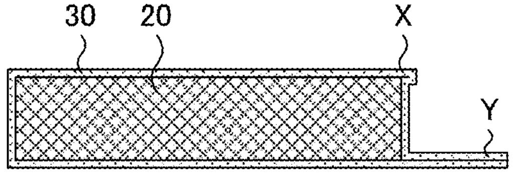

In the second covering step, the side surface member and the laminate film are adhered by a jig capable of surface contact with the surface configuring the outer periphery of the side surface member. FIGS. 14A to 14C are schematic side surface view exemplifying the second covering step in the present disclosure. As shown in FIG. 14A, the space S is formed between the laminate film 30 and the side surface member 20 in the above described first covering step. Also, by the above described first covering step, the end part adhered part Y is formed. Next, as shown in FIG. 14B, jig 41, jig 42, and jig 43 and jig 44 are pushed into the laminate film 30 and the side surface member 20. The jigs 41 to 44 are preferably heated. In the thickness direction $D_T$, the length (length of up and down direction of the drawing) of the jig 42 is shorter than the length (length of up and down direction of the drawing) of the side surface member 20. For this reason, there is a void between the jig 41 and the jig 42, and the excessive part of the laminate film 30 is gathered in that void. In this manner, as shown in FIG. 14C, the fused part X is formed.

Figure 15A:
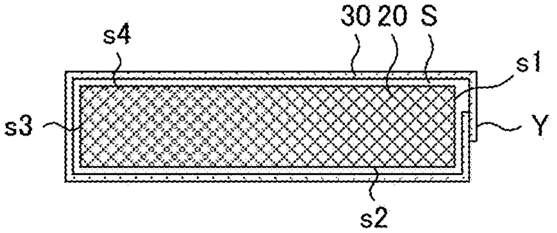
FIGS. 15A to 15E are schematic side surface views exemplifying the second covering step in the present disclosure.

Also, when the shape of the side surface member viewed from the side surface is a square shape, the second covering step may include later described first adhering treatment and second adhering treatment. For example, as shown in FIG. 15A, the shape of the side surface member 20 viewed from the side surface is square. This square includes first side s1, second side s2 close to the first side s1, third side s3 close to the second side s2 and oppose to the first side s1, and fourth side s4 close to the third side s3 and oppose to the second side s2. In FIG. 15A, the first side s1 and the third side s3 correspond to the shorter side configuring the outer periphery of the side surface member 20, and the second side s2 and the fourth side s4 correspond to the longer side configuring the outer periphery of the side surface member 20.

Figure 15B:
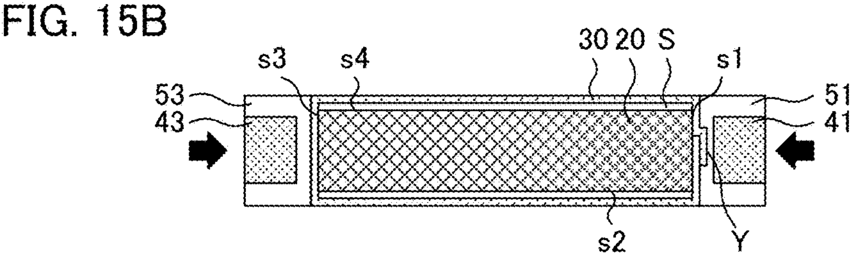

Next, as shown in FIG. 15B, from the first side s1 side in the side surface member 20, the first jig 41 is pushed into, and from the third side s3 side in the side surface member 20, the third jig 43 is pushed into. Thereby, the laminate film 30 is adhered respectively to the first side s1 and the third side s3 (first adhering treatment). In FIG. 15B, the first jig 41 includes first elastic member 51, and the third jig 43 includes third elastic member 53. Examples of the material for the elastic member may include a silicone rubber and a fluorine rubber.

Figure 15C:
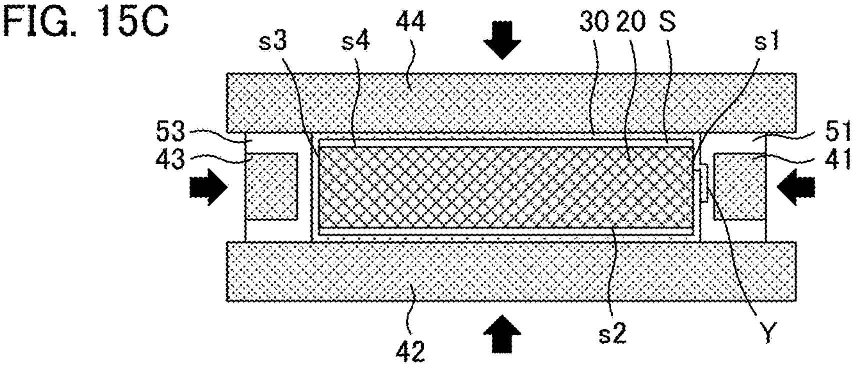
Figure 15D:
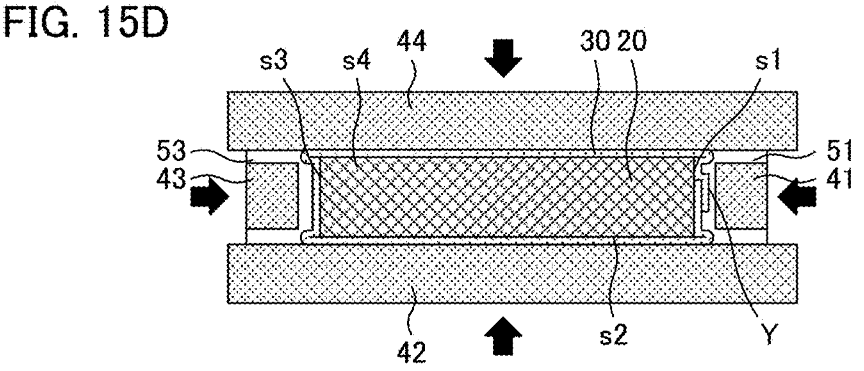
Figure 15E:
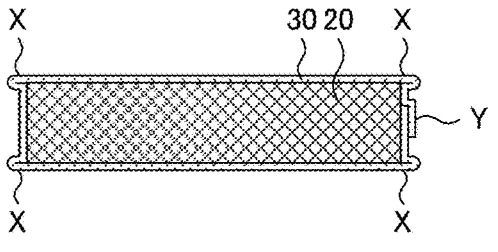

Next, as shown in FIGS. 15C and 15D, from the second side s2 side in the side surface member 20, the second jig 42 is pushed into, and from the fourth side s4 side, the fourth jig 44 is pushed into. Thereby, the laminate film 30 is adhered respectively to the second side s2 and the fourth side s4 (second adhering treatment). On this occasion, the first elastic member 51 and the third elastic member 53 are compressed and deformed by pushing into the second jig 42 and the fourth jig 44. Thereby, as shown in FIG. 15E, the fused part X is formed.

Figure 16A:
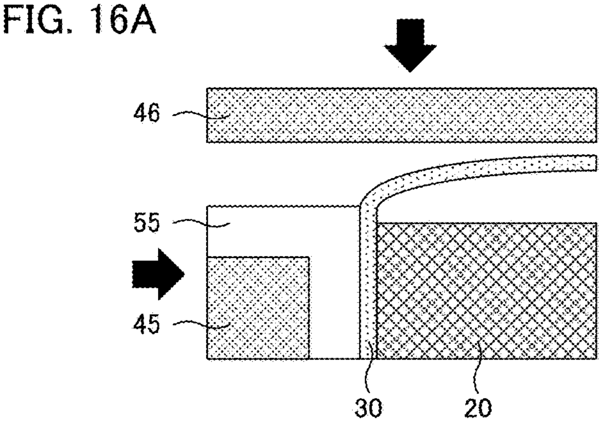
FIGS. 16A and 16B are schematic side surface views exemplifying the second covering step in the present disclosure.
Figure 16B:
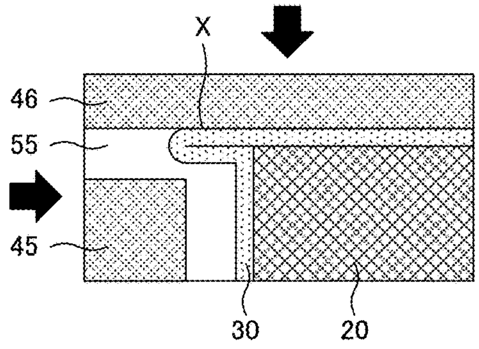

A situation of forming the fused part X will be explained with reference to FIGS. 16A and 16B. As shown in FIG. 16A, in the first adhering treatment, jig 45 including elastic member 55 is pushed into the side surface member 20. While maintaining this status, as shown in FIG. 16B, in the second adhering treatment, the elastic member 55 is compressed and deformed by jig 46. On this occasion, the elastic member 55 is compressed and deformed in a priority basis since it is softer than the side surface member 20, the jig 45 and the jig 46. The excessive part of the laminate film 30 is folded to follow the compression and deformation, and thereby the fused part X is formed.

In the present disclosure, it is preferable that the first side and the third side correspond to the shorter side configuring the outer periphery of the side surface member 20, and the second side and the fourth side correspond to the longer side configuring the outer periphery of the side surface member 20. In this case, the first jig and the third jig not heated may be pushed into in the first adhering treatment, and the second jig and the fourth jig heated may be pushed into in the second adhering treatment. By heating the entire outer periphery of the side surface member 20 by just the heat from the jigs (second jig and fourth jig) of the longer side, the structure of a sealing machine may be simplified.

Figure 17A:
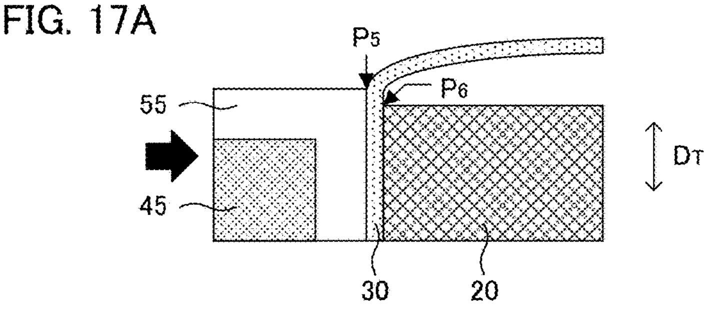
FIGS. 17A to 17C are schematic side surface views exemplifying the jig in the present disclosure.
Figure 17B:
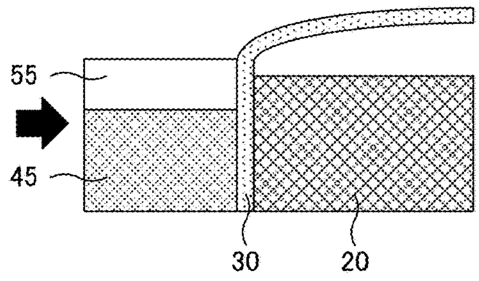
Figure 17C:
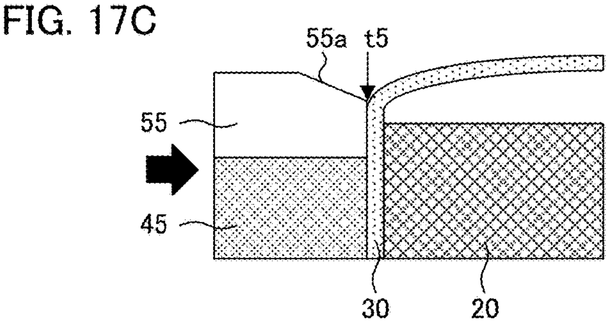

As shown in FIG. 17A, in a state the jig 45 including the elastic member 55 is pushed into, in the thickness direction $D_T$, position $P_6$ that is the top of the end part of the elastic member 55 in the side surface member 20 side is preferably higher than position $P_6$ that is the top of the end part of the side surface member 20 in the elastic member 55 side. When the relation of position $P_5$>position $P_6$ is satisfied, inner surfaces of the laminate film 30 are strongly compressed, and a fused part with more excellent sealing performance is formed. In other words, it is preferable that the length of the elastic member 55 and the jig 45 in the thickness direction $D_T$ is longer than the length of the side surface member 20 in the thickness direction $D_T$. Also, in FIG. 17A, a part of the elastic member 55 is arranged between the jig 45 and the side surface member 20. Meanwhile, as shown in FIG. 17B, the elastic member 55 may not be arranged between the jig 45 and the side surface member 20. Also, as shown in FIG. 17C, cut part 55*a* may be arranged in end part t5 of the elastic member 55 in the side surface member 20 side. By arranging the cut part 55*a*, the fused part can be stably formed.

4. Battery

The battery obtained by the aforementioned steps is in the same contents as those described in "A. Battery" above; thus, the descriptions herein are omitted.

The present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

REFERENCE SIGNS LIST

1 cathode active material layer
2 anode active material layer
3 electrolyte layer
4 cathode current collector
5 anode current collector
10 electrode body
11 top surface part
12 bottom surface part
13 first side surface part
14 second side surface part
15 third side surface part
16 fourth side surface part
20 side surface member
30 laminate film
100 battery
200 battery module

What is claimed is:

1. A battery comprising:
an electrode body;
a side surface member arranged in a side surface part of the electrode body; and
a laminate film that covers the electrode body, wherein;
as viewed from a side surface of the side surface member, an outer periphery of the side surface member of the battery is positioned in an inner side on the basis of an outer periphery of the electrode body;
the laminate film is arranged to cover a surface configuring the outer periphery of the side surface member and a surface configuring the outer periphery of the electrode body;
on the side surface member, a fused part, in which inner surfaces of the laminate film are fused, is arranged;
as viewed from the side surface of the side surface member, a shape of the side surface member is a square shape; and
the fused part is arranged in four corner parts configuring the outer periphery of the side surface member.

2. The battery according to claim 1, wherein, in a plan view of the battery from a thickness direction, the fused part is continuously arranged from an end part a of the laminate film in the side surface member side, until a position β of the laminate film corresponding to a boundary between the side surface member and the electrode body.

3. The battery according to claim 1, wherein, as viewed from a side surface of the side surface member, in a thickness direction of the battery, $P_1$ that is the highest position of the fused part is lower than $P_2$ that is the highest position of the laminate film arranged in the electrode body.

4. The battery according to claim 1, wherein, as viewed from a side surface of the side surface member, in a thickness direction of the battery, $P_1$ that is the highest position of the fused part is lower than $P_3$ that is the highest position of the electrode body.

5. The battery according to claim 1, wherein the side surface member is a current collecting terminal.

6. The battery according to claim 1, wherein;
the battery includes a pair of the side surface member; and
the pair of the side surface member is arranged to oppose to the electrode body.

7. The battery according to claim 1, wherein, as viewed from a side surface of the side surface member, a rate of $L_2$ that is a length of the outer periphery in the side surface member, with respect to Li that is a length of the outer periphery in the electrode body, the rate $L_2/L_1$ is 0.7 or more and less than 1.

8. The battery according to claim 1, wherein the electrode body includes layers in an order of, a cathode current collector, a cathode active material layer, an electrolyte layer, an anode active material layer, and an anode current collector, in a thickness direction.

9. A battery module comprising a plurality of a battery stacked in a thickness direction, wherein;
the battery is the battery according to claim 1.

10. The battery module according to claim 9, wherein the battery module includes a restraining jig that restrains the plurality of the battery in a thickness direction.

11. The battery module according to claim 10, wherein, in a pair of the side surface member neighboring in the thickness direction, a main surface of the laminate film arranged on one of the side surface member does not contact a main surface of the laminate film arranged on the other side surface member.

12. A method for producing a battery comprising:
an electrode body;
a side surface member arranged in a side surface part of the electrode body; and
a laminate film that covers the electrode body,
wherein;

as viewed from a side surface of the side surface member, an outer periphery of the side surface member of the battery is positioned in an inner side on the basis of an outer periphery of the electrode body;

the laminate film is arranged to cover a surface configuring the outer periphery of the side surface member and a surface configuring the outer periphery of the electrode body; and on the side surface member, a fused part, in which inner surfaces of the laminate film are fused, is arranged;

the method comprising:

a preparing step of preparing a structure body including the electrode body and the side surface member;

a first covering step of covering a surface configuring the outer periphery of the electrode body in the structure body, with the laminate film; and a second covering step of covering a surface configuring the outer periphery of the side surface member in the structure body, with the laminate film, wherein;

in the second covering step, the fused part is formed by a jig capable of surface contact with the surface configuring the outer periphery of the side surface member;

as viewed from a side surface of the side surface member, a shape of the side surface member is square;

the square includes a first side, a second side close to the first side, a third side close to the second side and oppose to the first side, and a fourth side close to the third side and oppose to the second side;

the second covering step includes:

a first adhering treatment of adhering the laminate film to the first side by pushing into a first jig from the first side in the side surface member, and to the third side by pushing into a third jig from the third side in the side surface member; and after the first adhering treatment, a second adhering treatment of adhering the laminate film to the second side by pushing into a second jig from the second side in the side surface member, and to the fourth side by pushing into a fourth jig from the fourth side in the side surface member; and at least one of the first jig and the third jig includes an elastic member, and in the second adhering treatment, the fused part is formed by pushing into the second jig and the fourth jig to compress and deform the elastic member.

* * * * *